(12) United States Patent
Grassi et al.

(10) Patent No.: US 7,894,438 B2
(45) Date of Patent: Feb. 22, 2011

(54) DEVICE AND METHOD FOR COMMUNICATING WITH A LEGACY DEVICE, NETWORK OR APPLICATION

(75) Inventors: Stephen J. Grassi, Sterling, VA (US); Samuel A. Moats, Winchester, VA (US); Oscar F. Roeder, Stephens City, VA (US); Faith B. Power, Winchester, VA (US)

(73) Assignee: Ambriel Technologies, Winchester, VA (US)

( * ) Notice: Subject to any disclaimer, the term of this patent is extended or adjusted under 35 U.S.C. 154(b) by 103 days.

(21) Appl. No.: 12/155,740

(22) Filed: Jun. 9, 2008

(65) Prior Publication Data

US 2008/0304482 A1 Dec. 11, 2008

Related U.S. Application Data

(60) Provisional application No. 60/924,997, filed on Jun. 7, 2007.

(51) Int. Cl.
*H04L 12/28* (2006.01)
(52) U.S. Cl. ...................................... 370/392
(58) Field of Classification Search .................. 370/351, 370/389, 392
See application file for complete search history.

(56) References Cited

U.S. PATENT DOCUMENTS

| 7,539,773 | B2 | 5/2009 | Akisada et al. | |
|---|---|---|---|---|
| 2002/0150104 | A1* | 10/2002 | Hamamoto et al. | 370/392 |
| 2003/0185236 | A1* | 10/2003 | Asano et al. | 370/469 |
| 2004/0141513 | A1* | 7/2004 | Takechi et al. | 370/401 |
| 2005/0243828 | A1* | 11/2005 | Tsuchiya et al. | 370/392 |
| 2005/0249213 | A1* | 11/2005 | Higuchi et al. | 370/390 |
| 2006/0109807 | A1* | 5/2006 | Lee | 370/315 |
| 2006/0227792 | A1* | 10/2006 | Wetterwald et al. | 370/395.52 |

* cited by examiner

*Primary Examiner*—Pankaj Kumar
*Assistant Examiner*—Gautam Sharma
(74) *Attorney, Agent, or Firm*—Nixon IP Law, PLC; William F. Nixon

(57) ABSTRACT

A translation device allows communication between two entities that are not compatible. The two entities can include a legacy entity that uses an address format not compatible with a newer entity. The translation device receives a packet for the legacy entity and converts its address to one that is compatible with the legacy entity. The translation device may use different processes to convert the address in accordance with messaging protocols, packet configuration or the destination address desired. Once the packet includes a compatible address, the device sends the packet to the legacy entity.

18 Claims, 14 Drawing Sheets

DEVICE AND METHOD FOR COMMUNICATING WITH A LEGACY DEVICE, NETWORK OR APPLICATION

FIELD OF THE INVENTION

The present invention relates to communication or the exchange of data between networks, applications and the like. More particularly, the present invention relates to a communication between a network and a legacy device, network or application.

DISCUSSION OF THE RELATED ART

Networks and the devices that run applications within the networks strive to communicate with each other in a secure and transparent manner. Problems, however, may occur that inhibits seamless communication between new components and legacy components. For example, recent problems have resulted in the move from an Internet Protocol version 4 (IPv4) environment to and Internet Protocol version 6 (IPv6) environment because of the different ways each environment reads and distributes information.

IPv6 networks enjoy several advantages over IPv4 ones. IPv6 networks can access a larger number of internet addresses for an ever-growing number of web locations and sites. IPv6 networks also provide more security over legacy, IPv4 networks. Thus, these improvements over IPv4 serve as a great motivator for agencies, organizations, companies and the like to transition to IPv6.

A potential downside to transitioning to a new platform or environment is compatibility with legacy networks and devices that still support applications used in the network. All the components within the network cannot be replaced with newer ones without major disruption in services. Further, the cost of replacing or upgrading all devices and applications is prohibitive. Because of these constraints, IPv6 components also need the capability to interact with IPv4 components.

Some solutions proposed to make IPv6 entities compatible with IPv4 includes placing an IPv6 "tunnel" over IPv4 networks. The issue of incompatible IP addresses is resolved as the tunnels only use IPv6 addresses on the inside of this tunnel. Problems with "tunneling" include the need for centralized servers to handle the tunnels over the IPv4 networks. These servers would require management resources and costs for IPv6 specific issues as well as IPv4 resources. The centralized nature also leads to single points of failure within the networks, which is a condition best avoided if possible. If a centralized server goes down, then potentially the entire network goes down. Reliable networks seek to avoid single points of failure.

Another proposed solution for new and legacy internet issues is a dual stack approach. Using dual stack, two separate addresses are made for each resource. One address is compatible for IPv4 legacy networks, while the other is for new IPv6. Problems with this approach include the need to still use IPv4 addresses from a shrinking address space. Another problem pertains to security issues in that the resource or network is still subject to IPv4 security issues. In other words, resources or entities using the dual stack approach leave themselves vulnerable to IPv4 security problems without the advantages gained by using IPv6.

In summary, measures exist to provide stop-gap measures in the transition from legacy IPv4 networks and device environments to the new IPv6 environments. These measures, however, increase unreliability of the networks due to single points of failure and the need for additional resources. The measures also fail to provide the additional security attendant to the newer IPv6 resources. Thus, the above discussed approaches fail to provide transparent and seamless communication between legacy networks and devices and newer networks and devices.

SUMMARY OF THE INVENTION

Accordingly, the disclosed embodiments of the present invention provide a device and method for seamless and transparent communication between IPv4 and IPv6 entities. The disclosed embodiments provide a gateway to allow IPv4 access to an IPv6-only network without compromising reliability or security, or increasing costs and resources. The embodiments of the present invention provide a solution that includes application layer transmission control protocol (TCP), internet control and messaging protocol (ICMP), and user datagram protocol (UDP) translation and specific application layer gateways (ALGs) that preserve functionality without modifying existing software or hardware.

This feature allows native IPv6 hosts and applications to communicate with IPv4, or legacy, hosts and applications, and vice versa without causing any of the problems encountered with other compatibility solutions, such as dual stack or tunneling. The disclosed embodiments include a device that forms a boundary between an IPv6 network, device, application or the like and an IPv4 legacy network, application, device or the like. The disclosed embodiments capture, translates and sends packets between newer IPv6 entities and legacy IPv4 entities.

Thus, the disclosed embodiments receive a packet and determine the appropriate way to convert or modify the packet header to be compatible with the destination for the packet. In other words, the address of the packet is changed in some manner, either by translating the current address into a new one, or placing a set value for the destination address into the header. Further, the conversion by require more than one process in order to properly configure the packet for delivery to the entity. The disclosed embodiments, therefore, can support a variety of different protocols, formats and packet types in making sure that the packets are properly delivered.

According to the disclosed embodiments, a method for communicating with an entity is disclosed. The method includes receiving a packet having an address not compatible with the entity. The method includes converting the address to a compatible address. The method also includes sending the packet to the entity according to the compatible address.

Further according to the disclosed embodiments, a translation device is disclosed. The translation device includes a first port to exchange a packet with a first entity. The translation device also includes a second port to exchange the packet with a second entity. The translation device also includes a translator to convert the packet to include an address compatible with the second entity.

Further according to the disclosed embodiments, a method for communicating with an entity is disclosed. The method includes determining an address of a packet destined for the entity is not compatible. The method also includes determining a format for the packet. The method also includes selecting a conversion process for the address according to the format. The method also includes converting the address of the packet to a compatible address using the conversion process. The method also includes sending the packet to the entity using the compatible address.

BRIEF DESCRIPTION OF THE DRAWINGS

The accompanying drawings are included to provide further understanding of the invention and constitute a part of the specification. The drawings listed below illustrate embodiments of the invention and, together with the description, serve to explain the principles of the invention, as disclosed in the claims.

DETAILED DESCRIPTION OF THE PREFERRED EMBODIMENTS

Reference will now be made in detail to the preferred embodiments of the present invention. Examples of the preferred embodiments are illustrated in the accompanying drawings.

Figure 1:
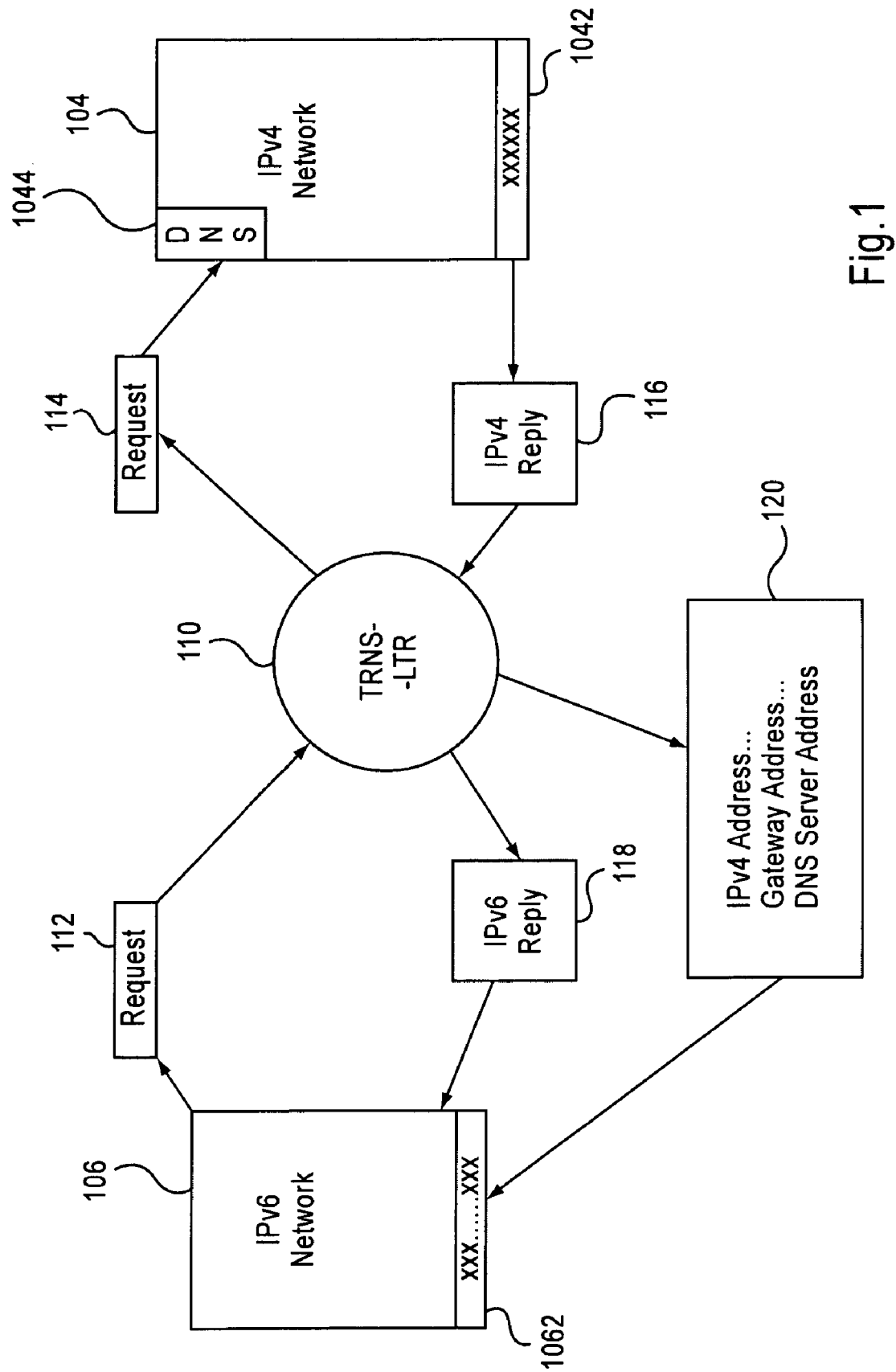
FIG. 1 illustrates an IPv6 network in communication with an IPv4 network according to the disclosed embodiments.

FIG. 1 depicts communication between an IPv6 network 106 and an IPv4, or legacy, network 104 according to the disclosed embodiments. Although the IPv4 and IPv6 entities are shown as "networks," the disclosed embodiments also applies to devices, platforms, applications or other entities or items using an internet protocol to perform communication operations. In fact, the disclosed embodiments apply to any existing legacy network or entity trying to communicate with a newer network or entity using IP addresses. Translation device 110 facilitates communication between networks 104 and 106.

Network 104 includes an IP address 1042 suitable for identification within in IPv4 environment. IP address 1042 may have a format preferable to IPv4 networks and entities, such as 216.12.73.237. IP address 1042 identifies network 104 uniquely to other resources, including network 106 and translation device 110. Network 106 also includes IP address 1062, which includes a format compatible with IPv6 resources, such as a hexadecimal address 2001:000:0000::1. As can be seen in this example, the formats of IP addresses 104 and 106 are not the same.

Translation device 110 according to the disclosed embodiments provides the functionality to establish and maintain communication between network 104 and network 106. Translation device 110 may form a boundary between networks 104 and 106 with network address translation and protocol translation while meeting constraints or requirements placed on such communication by applicable standards.

In short, translation device 110 retains a pool of globally routable IPv4, or legacy, addresses that are assigned to IPv6 nodes on a dynamic basis as sessions are initiated or terminated across the new and legacy internet boundaries. Referring to FIG. 1, network 106 may use a dynamic host configuration protocol (DHCP) to request IPv6 address information, as shown by request 112 to translation device 110. DHCP allows the assigning of addresses from a central location, such as a server. The central location assigns IP addresses to entities looking to connect to a network.

Upon receiving request 112, translation device 110 forwards address information block 120 back to network 106. Address information block 120 includes an IPv6 address, a gateway address and a domain name server (DNS) address provided by translation device 110. Translation device 110 assigns itself as the DNS for network 106. This assignment is done, preferably, by utilizing a flag that prompts network 106 to broadcast a request for a DNS address. By default, this flag is disabled. Alternatively, network 106 may have all its address information statically configured.

When network 106, acting as an IPv6 client of translation device 110, initiates a DNS query, packets are forwarded to translation device 110 acting as the DNS server. For example, a user on network 106 opens an internet browser and enters a website having a uniform resource locator (URL), such as http://www.ambrieltech.com, into the address field. The URL represents the IP address of another network, device, application or resource accessible by network 106. Network 106, therefore, performs the query to its DNS server, or translation device 110, attempting to resolve the URL to the appropriate IP address. This query also may be shown in FIG. 1 as request 112.

Translation device 110 analyzes the packet, shown as request 112, at the application layer and recognizes the packet as a DNS request. Translation device 110 then passes request 112 to the internal DNS ALG server. The DNS ALG server may be a fully functional DNS proxy server that receives the DNS query and translates request 112, which is compatible with IPv6 platforms, to request 114, which is compatible with IPv4 platforms. After the translation occurs, translation device 110 forward request 114 asking for the URL addresses noted above to DNS server 1044 for network 104.

Network 104 responds via DNS server 1044 to translation device 110 with the IPv4 address for the requested URL, as shown by IPv4 reply 116. The DNS ALG in translation device 110 receives reply 116 to create an IPv6 address that is sent in IPv6 reply 118 to network 106. The creation of the IPv6 address is a process disclosed in greater detail below but can be summarized here. Translation device 110 adds a configurable prefix, such as 2000:ffff::, for example, to the IPv4 address received with reply 116. The configurable prefix is added to the beginning of the IPv4 address received in reply 116. The configurable prefix may be any value, especially if such a value is imposed or mandated by a standards authority or to be compatible with such standards to facilitate translation processes. The configurable prefix provided above is an example only and is shown for illustrative purposes only, and is no way limiting the disclosed embodiments to its specific value.

In the disclosed example, the IPv4 address received with reply 116 is converted to hexadecimal. Thus, referring to FIG. 1, reply 118 includes the prefix attached to the URL. Upon translation of the IPv4 address given in the example above, the prefix of 2000:ffff: is combined with the translation of the IPv4 address, or d80c:49ed, which is the hexadecimal equivalent of the IPv4 address 216.12.73.237 for network 104. Then, translation device 110 finds a route for the newly created packet, or reply 118, which is queued to the appropriate outbound interface to network 106.

Once network 106 receives reply 118, it initiates a connection to the desired URL using the IPv6 address created by translation device 110. During the connection, network 106 may communicate with network 104, which is identified by the respective IPv6 address created by translation device 110. Network 106 generates and sends a packet to translation device 110. Translation device 110 creates a binding between the IPv6 address of network 106 and one of the IPv4 addresses it has in its pool. The binding is used as the source address of the outgoing request to network 104. Translation device 110 then translates the packet by replacing the IPv6 header and options to conform to IPv4 standards. As translation device 110 is generating the packet for the external interface, a table is formed to track IPv6 to IPv4 address mappings for TCP/UDP connectivity. This is disclosed in greater detail below.

Figure 2A:
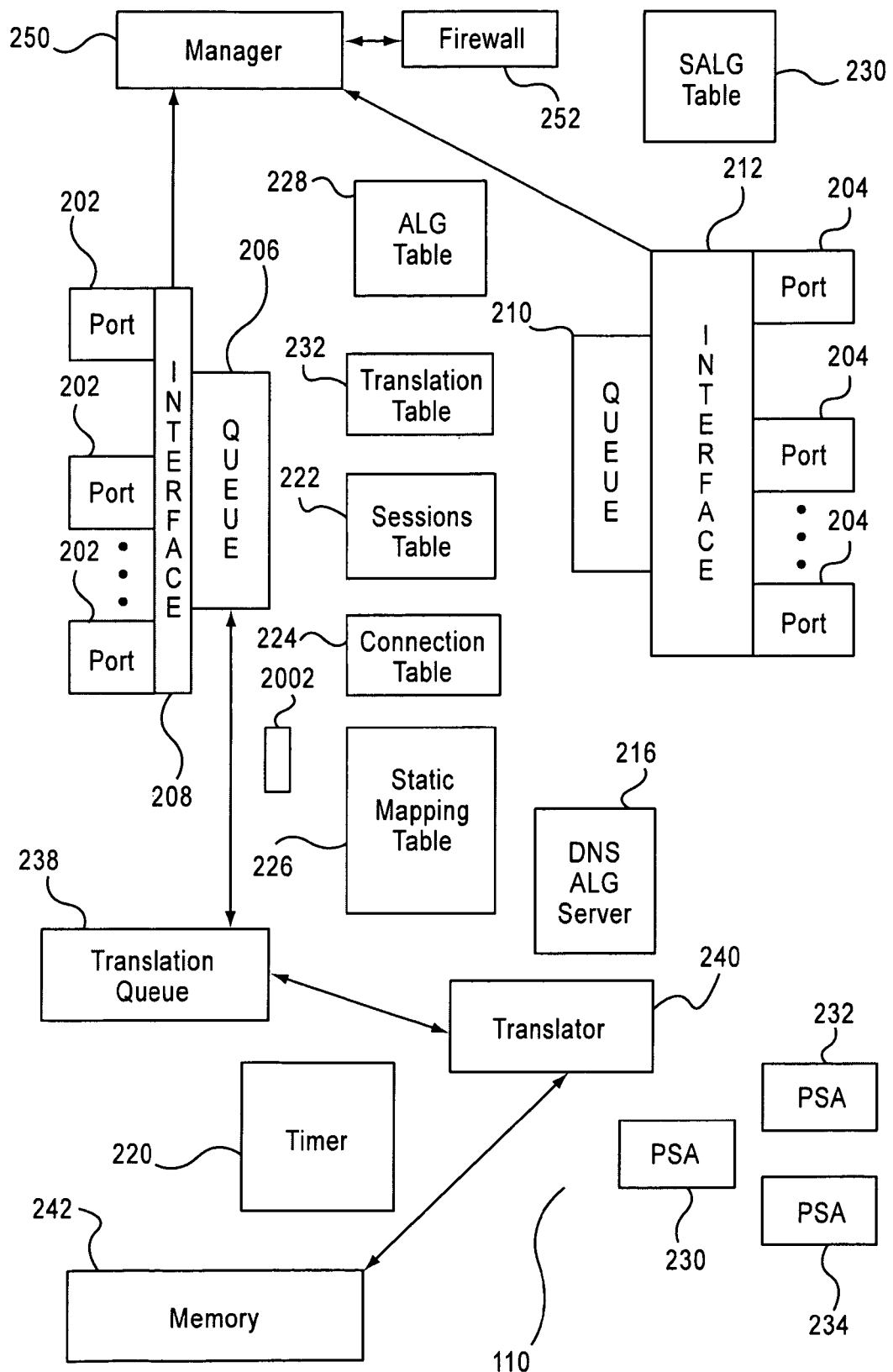
FIG. 2A illustrates a block diagram of a device for communicating according to the disclosed embodiments.

FIG. 2A depicts a block diagram of a translation device 110 according to the disclosed embodiments. The features of translation device 110 are disclosed in greater detail with reference to FIGS. 3-12, which show the functionality used within translation device 110. The components of translation device 110 are shown in FIG. 2A to provide a reference for the subsequent discussion. The components may be implemented as software and/or hardware components within translation device 110.

Translation device 110 includes ports 202 that receive packets from a newer network, preferably using an IPv6 environment, such as network 106. Ports 202 also may send packets to network 106 using interface 208 and queue 206. Once packets have been translated, they may be placed in queue 206 to await access to the appropriate port 202. The same configuration may be used for ports 204, which send and receive packets from a legacy network, such as network 104. Queue 210 and interface 212 facilitate the proper delivery of outgoing packets to the appropriate port 204.

Translation device 110 also includes DNS ALG server 216, disclosed above. Server 216 acts as a domain name server within translation device 110 to translate and forward a DNS request to the appropriate legacy server. Server 216 also may appear as the domain name server for network 106 to an IPv4 environment.

Timer 220 of translation device 110 is dynamically updated depending on available space, such as memory 242, to maintain new addresses. In other words, timer 220 reduces the space used in memory 242 as the number of sessions supported by translation device 110 increases. Timer 200 also may peel off dead sessions that take up space. Timer 220 may decide how long a connection stays open between network 104 and network 106. As space becomes unavailable due to large traffic, timer 220 will shorten the time needed to terminate a dead connection to free up that space for new connections. The functionality of timer 220 is disclosed in greater detail with reference to FIG. 10 below.

When packets are tagged to be translated, they may be placed in translation queue 238. The packet may reside there while translator 240 performs its operations in converting the packet for its destination. Manager 250 of translation device 110 may decide if a packet, such as packet 2002, should go to translation queue 238. Manager 250 may interact with firewall 252 in determining whether an incoming packet is acceptable.

Figure 2B:
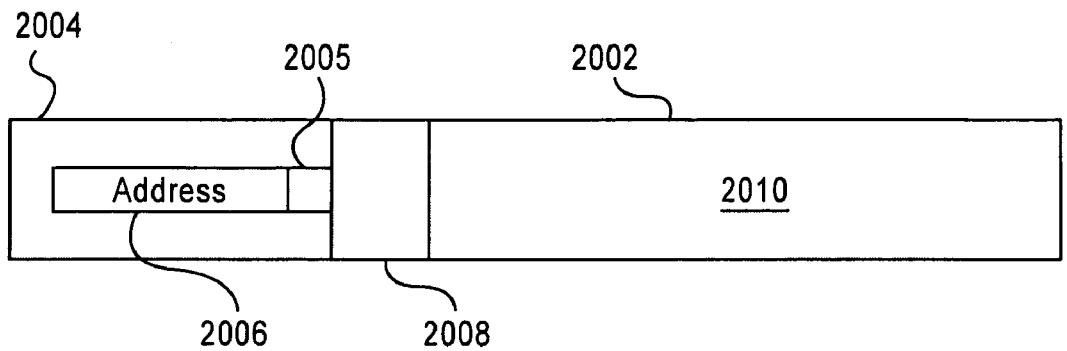
FIG. 2B illustrates a packet of data according to the disclosed embodiments.

Packet 2002 is shown in greater detail by FIG. 2B. Packet 2002 may represent the packets disclosed in this specification, but packets are not limited to the configuration shown. Packet 2002 includes header 2004 and data 2010. Header 2004 includes address 2006 that sets forth the delivery destination for packet 2002. The destination should match some resource or entity connected to translation device 110. Alternatively, address 2006 may specify a local address to translation device 110 that does not require packet 2002 being placed out on a network.

Header 2004 also includes checksum flag 2005. Flag 2005 indicates if address 2006 has been modified from its original value, such as a translation from IPv4 to IPv6. Buffer 2008 may sit between header 2004 and data 2010 to allow some extra space if needed. Alternatively, buffer 2008 may not exist at all within packet 2002. Although packet 2002 has been disclosed as shown in FIG. 2B, it should be noted that any packet configuration known to one skilled in the art may be used. The disclosed embodiments are not limited to the packet configuration disclosed by FIG. 2B.

Other features of translation device 110 include session table 222, connection table 224, static mapping table 226, ALG table 228 and SALG table 230. These components are disclosed in greater detail below, but are briefly summarized here. Connection table 224 builds and terminates connections between entities using translation device 110, such as networks 104 and 106. Session table 222 is similar in function to connection table 224, but is more permanent or static. Session table 222 and connection table 224 may be considered two separate areas of memory, as they differ. Connection table 224 is dynamic and updates every time a packet is processed.

For example, session table 222 keeps track of when a particular communication session open or closes between entities. Session 222 should have one entry for this communication session that does not change with every message or packet sent between, for example, network 104 and network 106. Connection table 224, on the other hand, is more dynamic and updates itself with every packet that flows between the networks. For each packet being translated, connection table 224 includes an entry until the packet is sent to its destination. For example, session table 222 may include the session between a user and an email server, while connection table 224 tracks each packet of email sent back and forth over the connection.

ALG table 228 lists those connections that require special handling on top of TCP or user datagram protocol (UDP). The sessions still use TCP or UDP, but translation device 110 needs to treat them in a special manner. The packets associated with the connections in ALG table 228 include some aspect that requires the packet body by treated as an embedded IPv4 address. Something needs to be done above and beyond the usual translation protocols. For example, the FTP standard may be used which requires communications between entities be done on separate paths. SALG table 230 is similar to ALG table 228 except for handling connections that require an even higher level of translation. A device having connections in SALG table 230 may understand the need for the higher level of translation, and is not stand alone from the translation process. Preferably, the number of connections listed in ALG table 228 or SALG table 230 is small compared to connections listed in other tables.

Protocol specific actions (PSAs) 230, 232, and 234 are programs that handle specific operations that require some special function. Only a very small percentage, such as 2%, will access PSAs during communications. A PSA may execute and modify a packet to be compatible according to its specific protocol. For example, PSA 230 may receive a packet 2002 for an instant messaging service that requires that the data is move around to create a whole new packet as the new address is placed between the data and the legacy address. Referring to FIG. 2B, the new address may be placed in buffer 2008 between address 2006 and data 2010. In other words, something more than header 2004 is modified in making the packet compatible.

Figure 3A:
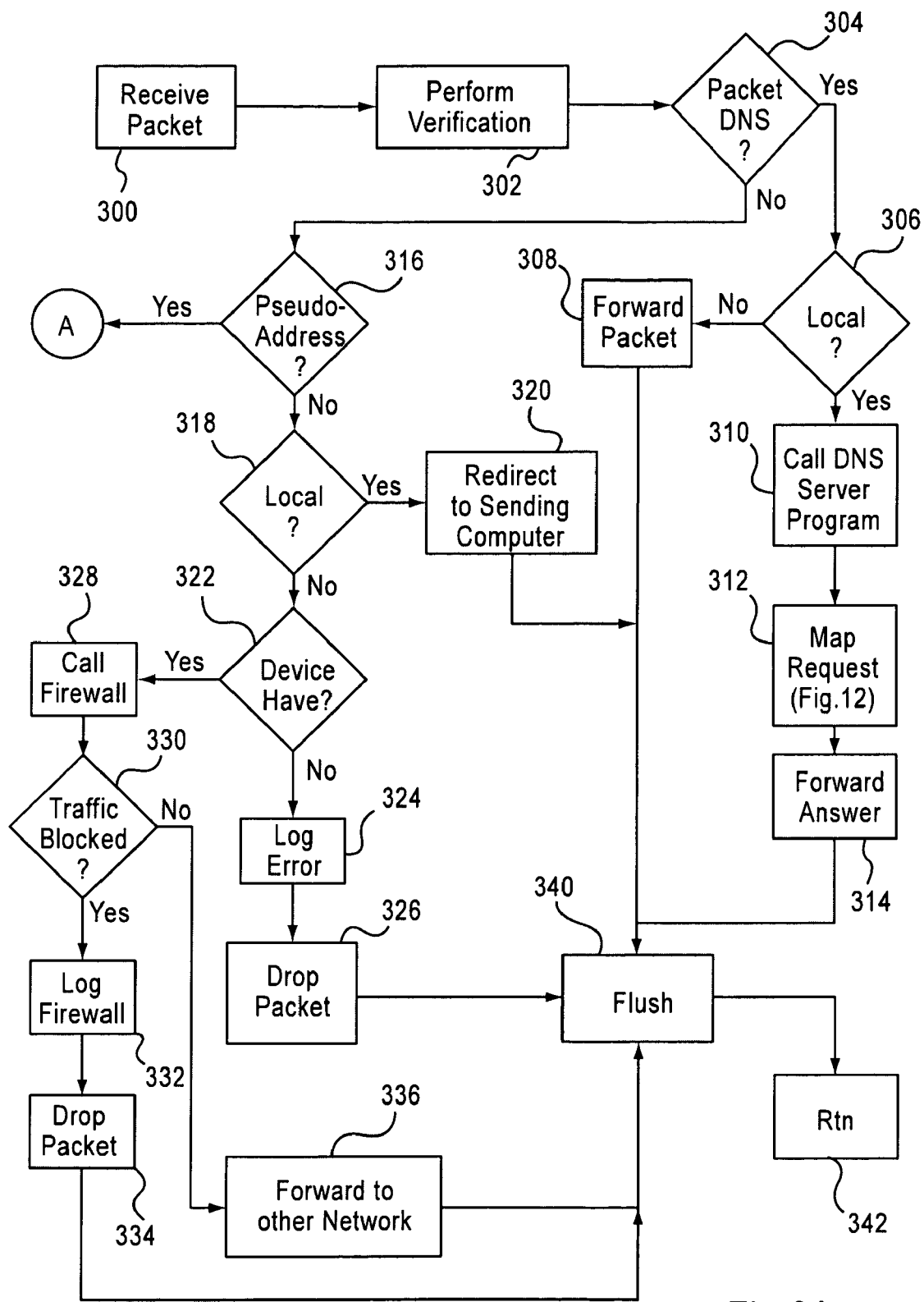
FIGS. 3A and 3B illustrate a flowchart for managing a packet received at the translation device according to the disclosed embodiments.
Figure 3B:
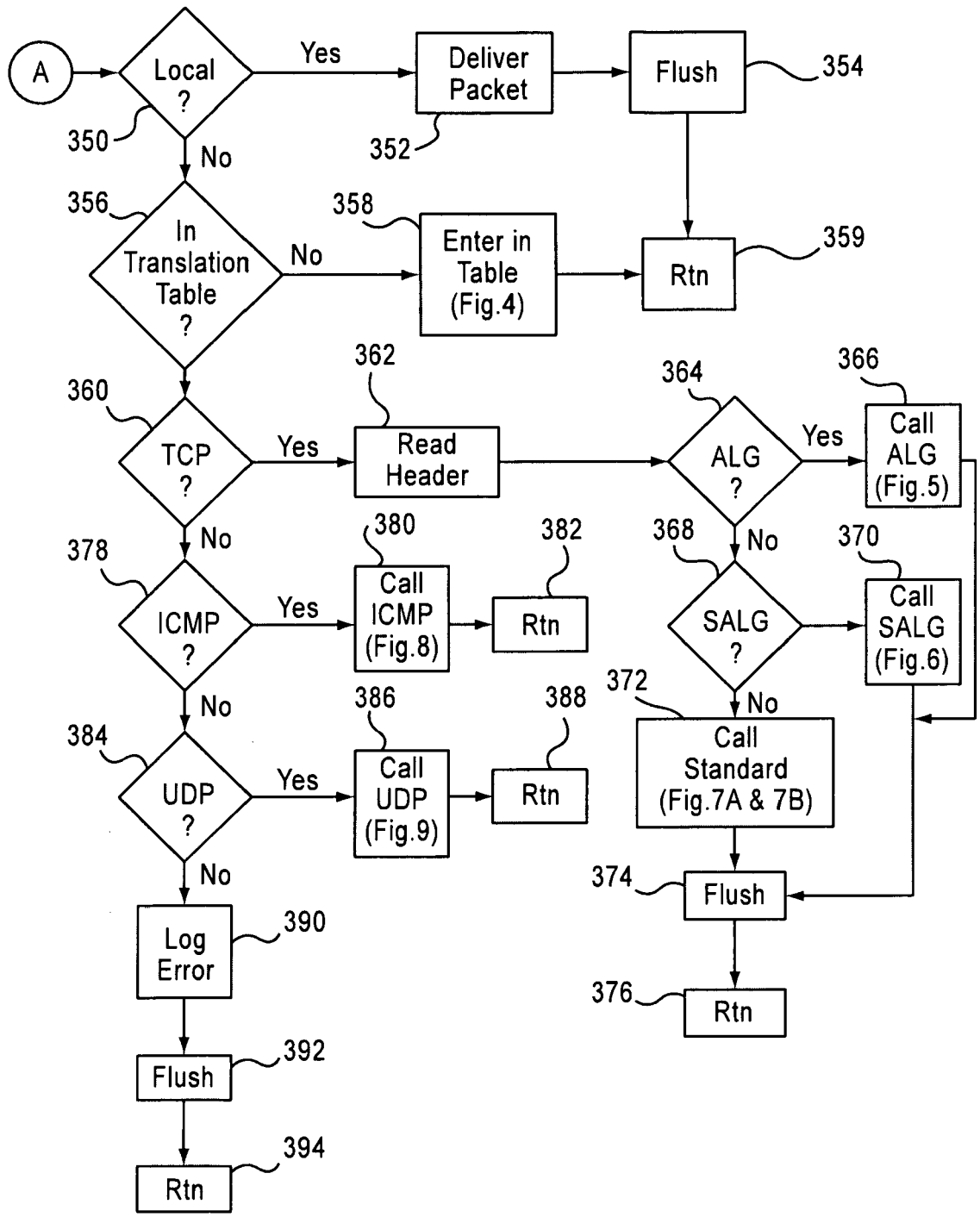

FIGS. 3A and 3B depict a flowchart for managing a packet received at translation device 110 according to the disclosed embodiments. Step 300 executes by receiving a packet, such as packet 2002, at translation device at one of the ports connected to network 104 or network 106. Step 302 executes by performing verification on the received packet. The verification is cursory and ensures that translation device 110 should have the packet and that the packet is correctly formatted. Step 304 executes by determining whether the packet includes a request for DNS services. If step 304 is yes, then the packet may be forwarded directly to the DNS-ALG translator as translation device 110 will not try to translate the packet directly.

Step 306 executes by determining whether packet 2002 is meant for a local address within translation device 110, as set forth by address 2006. If no, then step 308 executes by forwarding packet 2002 to the customer or destination address 2006. No translation is needed to perform this operation. The disclosed process then goes to step 340 to flush, or remove, the packet from queue 206 or 210 of translation device 110, and any appropriate tables. Step 342 executes to return to the beginning of the flowchart.

If step 306 is yes, then step 310 executes by calling a DNS server program. The DNS server program performs the function of analyzing DNS traffic to determine where and what the answer would be for a legacy environment for the address. Step 312 executes by mapping the request to the newer, for example, IPv6, environment. This step is disclosed in greater detail with reference to FIG. 12.

Figure 12:
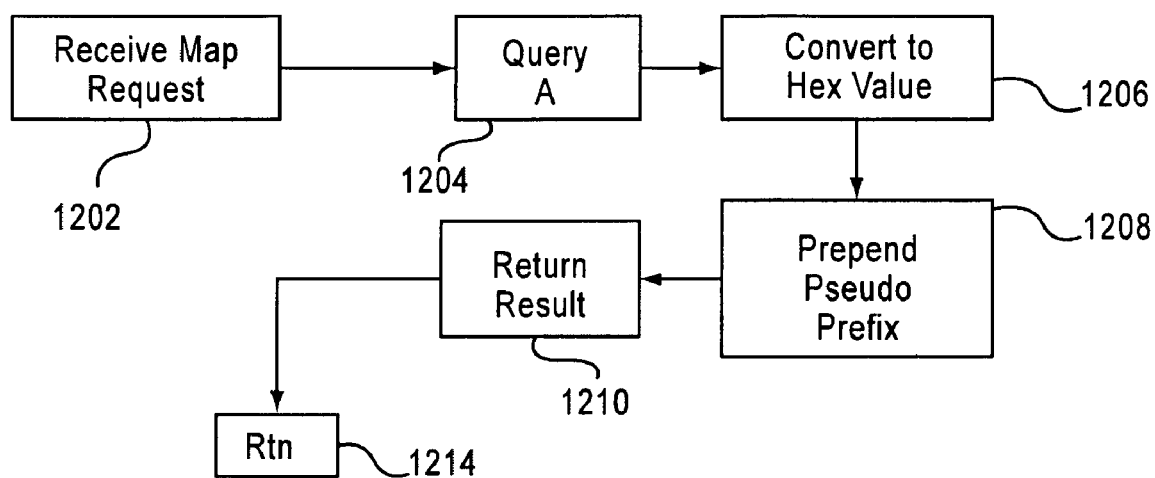
FIG. 12 illustrates a flowchart for mapping a request according to the disclosed embodiments.

FIG. 12 depicts a flowchart for mapping a request according to the disclosed embodiments. Step 1202 executes by receiving a map request from manager 250. A map request converts the packet header 2004 to the newer address format. Step 1204 executes by querying the algorithm to convert the address. Step 1206 executes by converting the legacy address value to a format compatible with the newer address environment. For example, IPv4 addresses may be converted to hexadecimal values compatible with IPv6.

Step 1208 executes by prepending a pseudo prefix to the converted address to further make the address compatible with the newer network environment. Using the above example, a pseudo prefix of set forth by an adopted standard may be used such that the same prefix should be used for all converted addresses. Further according to the example, a pseudo prefix of 2000:ffff: may be used. The pseudo prefix also may be known as a configurable prefix as the prefix can be configured to have different values.

Figure 2C:
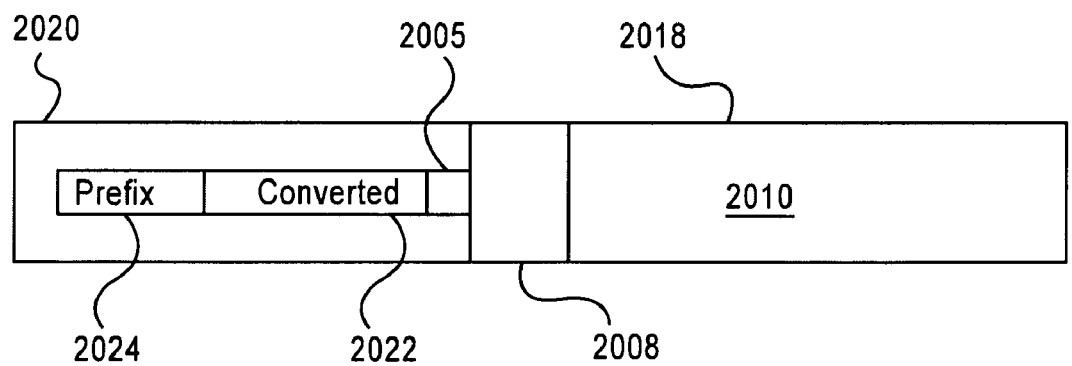
FIG. 2C illustrates a packet of data having a converted header according to the disclosed embodiments.

Step 1210 executes by returning the result, or answer, to the algorithm query. FIG. 2C depicts a packet 2018 having a converted header 2020 according to the disclosed embodiments. Packet 2018 should be ready for IPv6, or newer, networks. Packet 2018 includes converted address 2022 and prefix 2024 created as a result of the process disclosed by FIG. 12. Further, address 2022 and prefix 2024 may comprise a pseudo-address, as disclosed above. Checksum flag 2005 is accessed and updated to properly reflect the new packet, as address 2006 was modified.

Buffer 2008 and data 2010 also comprise packet 2018, but these features should not be modified from their original configuration. In other words, the disclosed embodiments should not modify the underlying data within the original packet. Thus, a converted value for the destination address is provided to the management process for further determinations using the embodiments disclosed by FIG. 12. Step 1214 executes by returning back to the flowchart of FIG. 3A.

Step 314 of FIG. 3A executes by forwarding the answer to the requesting client so that the determination proceeds from the top of the flowchart. Step 340 executes by flushing the packet information from the appropriate queues and table, and followed by the execution of step 342, disclosed above.

Referring back to step 304, if the determination is no, then step 316 executes by determining whether the packet includes a pseudo-address, such as one having a converted address 2022 and prefix 2024 shown in FIG. 2C. A pseudo-address may indicate that the packet is already compatible with the newer network environment. For example, an address having a hexadecimal format may be ready for an IPv6 environment. If yes, then the flowchart proceeds to "A" which continues the flowchart in FIG. 3B. FIG. 3B is disclosed in greater detail below. If step 316 is no, then step 318 executes by determining whether the address corresponds to a local address. If yes, then step 320 executes by redirecting the packet back to the sending computer with an ICMP redirect indicating the proper gateway. The flowchart then proceeds to step 340 to flush the packet, disclosed above.

If step 318 is no, then step 322 executes by determining whether translation device 110 has the address requested by the packet. If no, then step 324 executes by logging an error to manager 250. Step 326 executes by dropping the packet from the appropriate queues and lists within translation device 110. The flowchart then proceeds to step 340.

If step 322 is yes, then step 328 executes by calling firewall 252 to check the packet against any prohibited traffic registered by firewall 252. Firewall 252 may be an adaptive, or "intelligent," firewall in that it updates itself and reacts to the updates accordingly. Step 330 executes by determining whether firewall 252 indicates traffic such as the packet is blocked from proceeding to delivery. The reasons behind blocking traffic vary, such as security, access, banned content, and the like. If step 330 is yes, then the delivery of the packet is blocked and step 332 executes by logging the denial in firewall 252. Step 334 executes by dropping the packet from translation device 110. The flowchart then proceeds to step 340.

If step 316 of FIG. 3A is yes, then a pseudo-address is found within the packet header of the packet, such as header 2004 of packet 2002, and step 350 executes by determining whether the packet header is being sent to a local address. If step 350 is yes, then step 352 executes by delivering the packet to the address indicated. Step 352 deals with those instances where the packet is being sent to a local address within translation device 110. Thus, header 2004 includes address 2006 that identifies a destination within translation device 110. Step 354 executes by flushing the packet from the appropriate queues and lists in translation device 110. The flowchart then proceeds to step 359, disclosed in greater detail below.

If step 350 is no, then step 356 executes by determining whether the address of the packet header is within translation table 232. Essentially, the determination is whether the process has seen this address before. If so, then the address should be in the translation table and will not need to be added to the table, and flow proceeds to step 360. If not, then step 358 executes by entering the address of the packet header into translation table 232. This process is disclosed in greater detail with reference to FIG. 4.

Figure 4:
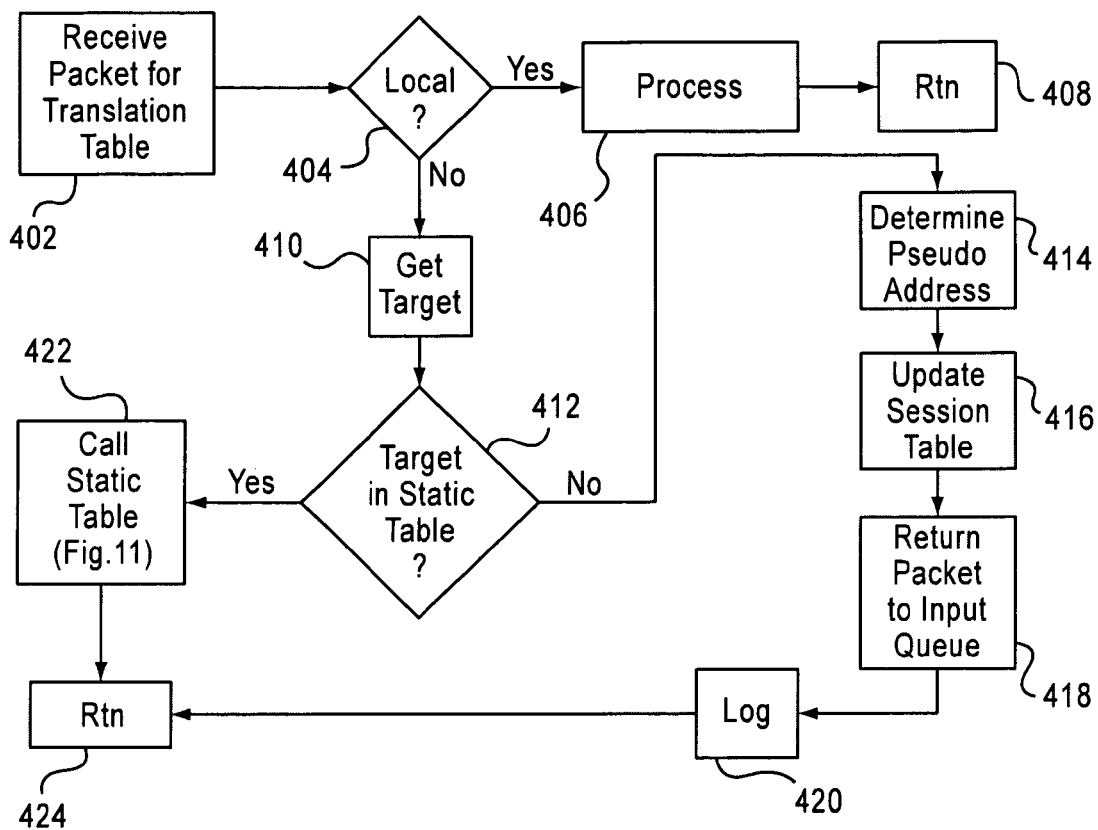
FIG. 4 illustrates a flowchart for placing an address in a translation table according to the disclosed embodiments.

FIG. 4 depicts a flowchart for placing an address in translation table 232 according to the disclosed embodiments. Step 402 executes by receiving the packet for being placed in translation table 232. Step 404 executes by determining whether the packet includes an address for a local destination within translation device 110. The disclosed embodiments may implement repetitive checks for increased confidence. If step 404 is yes, then step 406 executes by processing the packet and sending it to its local destination. Step 408 then executes by returning to the flowchart in FIG. 3B.

If step 404 is no, then step 410 executes by getting the target, or destination, address for the packet. Manager 250 may initiate a DNS query to determine target. Step 412 then executes to determine whether the target is within static mapping table 226. Static mapping table 226 represents the connections from newer network hosts accessible by legacy environments. In other words, static mapping table 226 provides an IPv6 only host accessible by IPv4 only environments. Preferably, static mapping table 226 includes one to one mapping between legacy addresses and the corresponding newer addresses. For example, referring back to FIGS. 2B and 2C, static mapping table 226 would includes a mapping for address 2006 in packet 2002 to the address having prefix 2024 and converted address 2022 in packet 2018.

If the target is not within static mapping table 226, then step 414 executes by determining a pseudo-address for the address, using the conversion process disclosed above by converting address 2006 and adding a prefix to the converted address. This step finds out what the pseudo-address for the newer environments should be. Step 416 executes by updating session table 222 with the mapped connection. Step 418 executes by returning the packet with the pseudo-address back to input queue 210 to go back through the process. Step 420 executes by logging back to the actual newer address to provide accountability. For example, the log may state that at a certain time, T, a connection was created between a legacy resource and a newer resource. The log may be local or an external centralized server. The user may choose where the log is maintained. The flowchart then proceeds to step 424 to return back to FIG. 3B.

Figure 11:
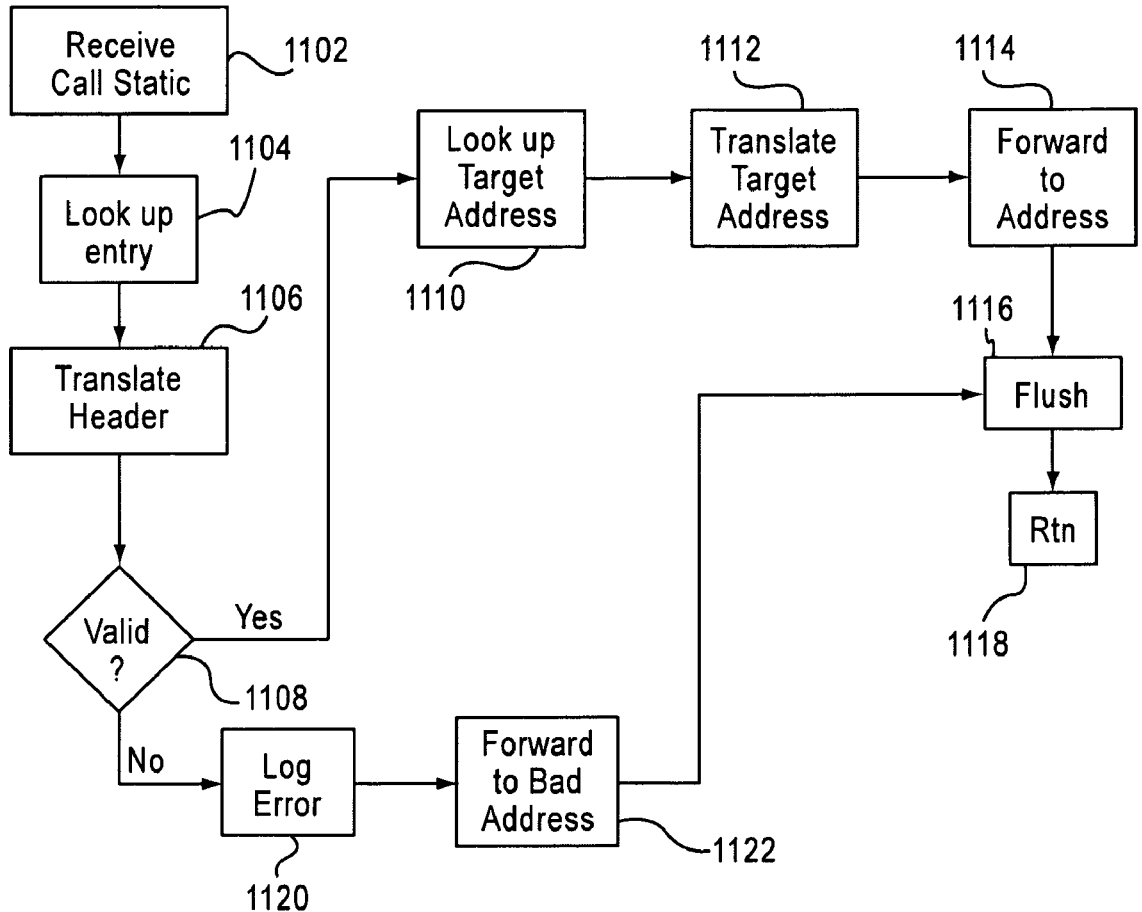
FIG. 11 illustrates a flowchart for calling a static mapping table according to the disclosed embodiments.

If step 412 is yes, then this means that the target is in static mapping table 226. Thus, step 422 executes by calling static mapping table 226. This process is disclosed in greater detail with reference to FIG. 11. FIG. 11 depicts a flowchart for calling static mapping table 226 according to the disclosed embodiments. Step 1102 executes by receiving a call static mapping table command. Step 1104 executes by looking up the entry in static mapping table 226. Step 1106 executes by translating the header.

In this instance, the disclosed embodiments are performing the same translation from IPv4 to IPv6, or vice versa, but doing so for a statically mapped client, not a dynamic entity. Translation device 110 knows specifically where the packet is supposed to be sent. The header is populated with this information.

Step 1108 executes by determining whether the translated header is valid. If yes, then step 1110 executes by looking the valid target address in static mapping table 226. Step 1112 executes by translating the target address using the entry in static mapping table 226. Step 1114 executes by forwarding the packet to the translated address. Step 1116 executes by flushing the packet for appropriate queues. Step 1118 executes by returning to FIG. 4.

If step 1108 indicates the translated header is not valid, then step 1120 executes by logging the error of the invalid address. Errors are logged locally or to a remote server, as disclosed above. Step 1122 executes by forwarding the packet with the invalid TCP options. Although the translated packet is not valid, that does not mean that it should not be delivered. Some security protocols dictate that all packets be delivered. The flowchart then proceeds to step 1116, disclosed above.

Returning back to FIG. 3B, if step 356 indicates that the address is within the translation table, then step 360 executes by determining whether the address uses a TCP format. If yes, then step 362 executes by reading the header. Step 364 executes by determining whether the ALG process should be called. If yes, then step 366 executes by calling the ALG process so that the packet can be processed using ALG table 228. This process is disclosed in greater detail with reference to FIG. 5.

Figure 5:
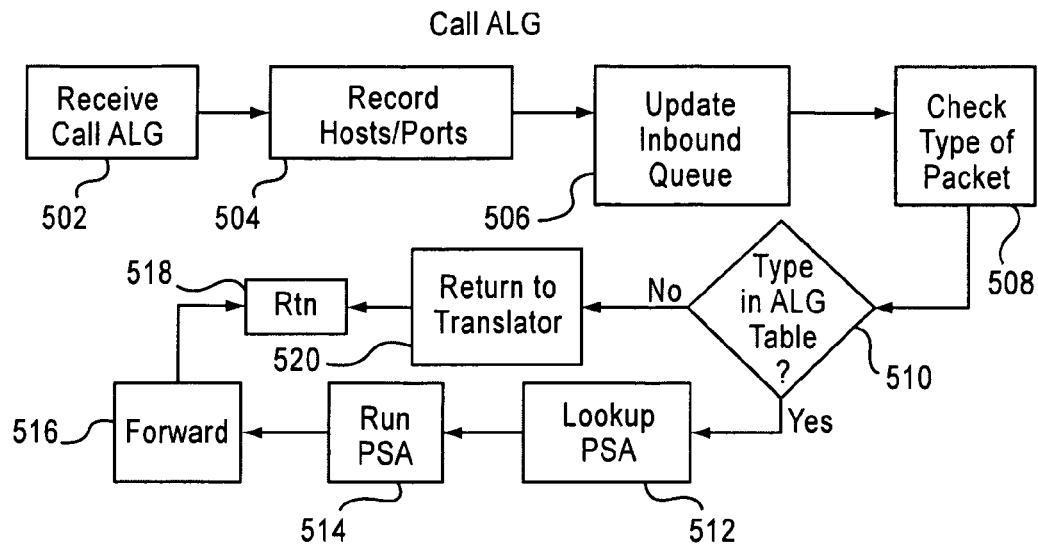
FIG. 5 illustrates a flowchart for calling an ALG process according to the disclosed embodiments.

FIG. 5 depicts a flowchart for calling an ALG process according to the disclosed embodiments. The ALG process is called to handle traffic that requires more in depth translation beyond headers. In other words, the packet body may be changed. Step 502 executes by receiving the call ALG instruction, preferably, from manager 250. The instruction is generated when translation device 110 is called upon to handle traffic that requires the more substantive translation operations. Step 504 executes by recording the host/port that the packet arrived at so that this information is available with reconstructing the new packet. In other words, translation device 110 knows where an email came from that is going to network 104. Step 506 executes by updating the inbound or input queue, such as queue 206 or 212, that the packet is being converted or translated. Step 508 executes by checking the type of packet received. For example, the packet may include data in an audio or video format, MP3 file, text and the like.

Step 510 executes by determining whether the packet type is covered in ALG table 228. In other words, ALG table 228 includes entries to process the type of packet received. If yes, then step 512 executes by looking up the PSA, such as PSA 230, applicable to the received packet. Step 514 then executes by running the PSA to generate the information needed to insert into or replace the header of the received packet to be delivered. Step 516 executes by forwarding the translated packet to the converted destination address via output ports. Step 518 executes by returning the flowchart back to the top to retrieve the next packet. If step 510 is no, then step 520 executes by returning back to the general translator process disclosed in FIGS. 3A and 3B, and goes to step 518. This event is logged because it will probably cause a network problem.

If step 364 is no, then the ALG translation process is not applicable, and the flowchart proceeds to step 368 to determine the SALG process should be called. If yes, then step 370 executes by calling the SALG process, which is disclosed in greater detail with reference to FIG. 6. An SALG process will be called very infrequently and for different reasons than the ALG process. The SALG process is an "almost" application layer proxy that does direct packet modifications. Further, the SALG processes are implemented as modular functions.

Figure 6:
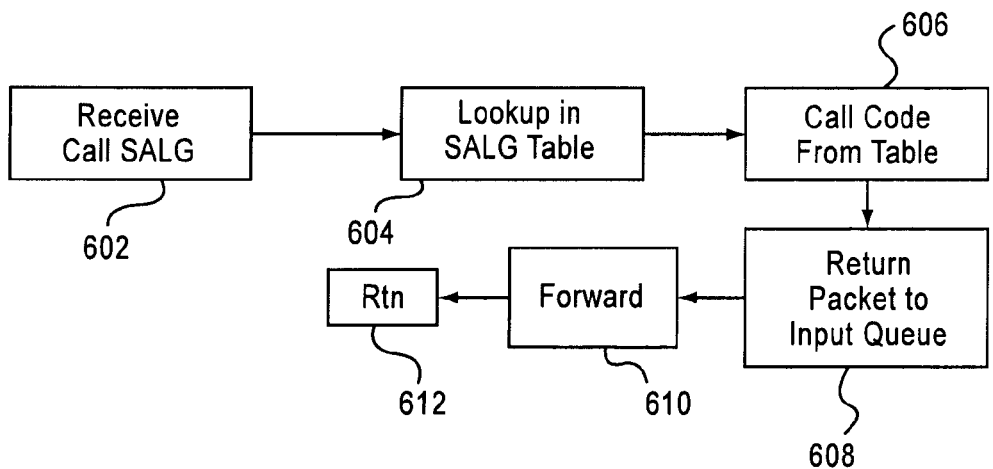
FIG. 6 illustrates a flowchart for calling a SALG process according to the disclosed embodiments.

Referring to FIG. 6, step 602 executes by receiving a call SALG instruction, preferably from manager 250. Step 604 executes by looking up the referred address from the packet header in SALG table 230. Step 606 executes by calling the code from SALG table 230. Step 608 executes by returning the packet to the input queue, such as queue 206 or 212, so that the packet can be forwarded to the destination address specified by the code. Step 610 executes by forwarding the packet according to the code. Step 612 executes by returning the flowchart back to FIG. 3B.

Figure 7A:
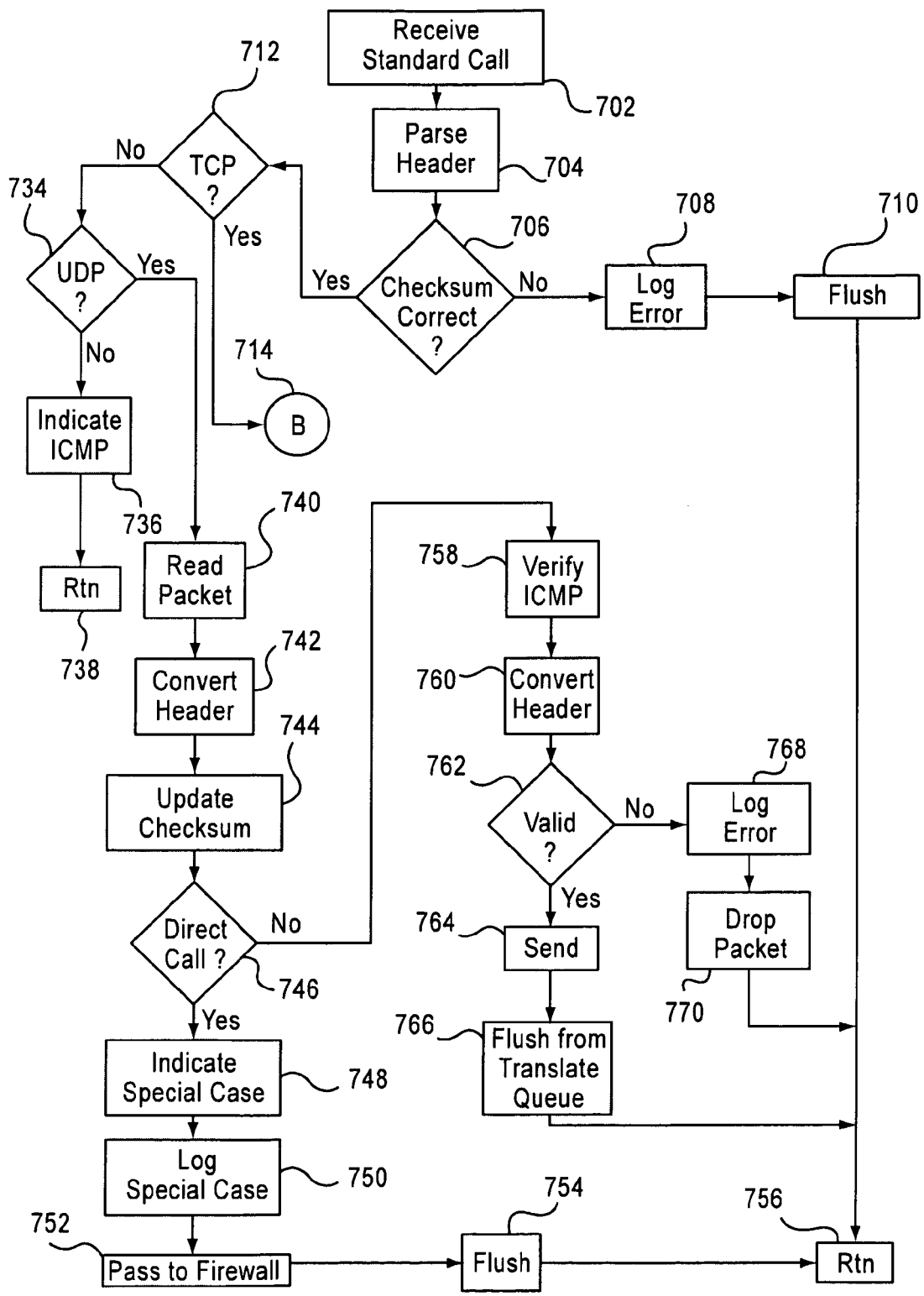
FIGS. 7A and 7B illustrate a flowchart for translating a packet header according to the disclosed embodiments.
Figure 7B:
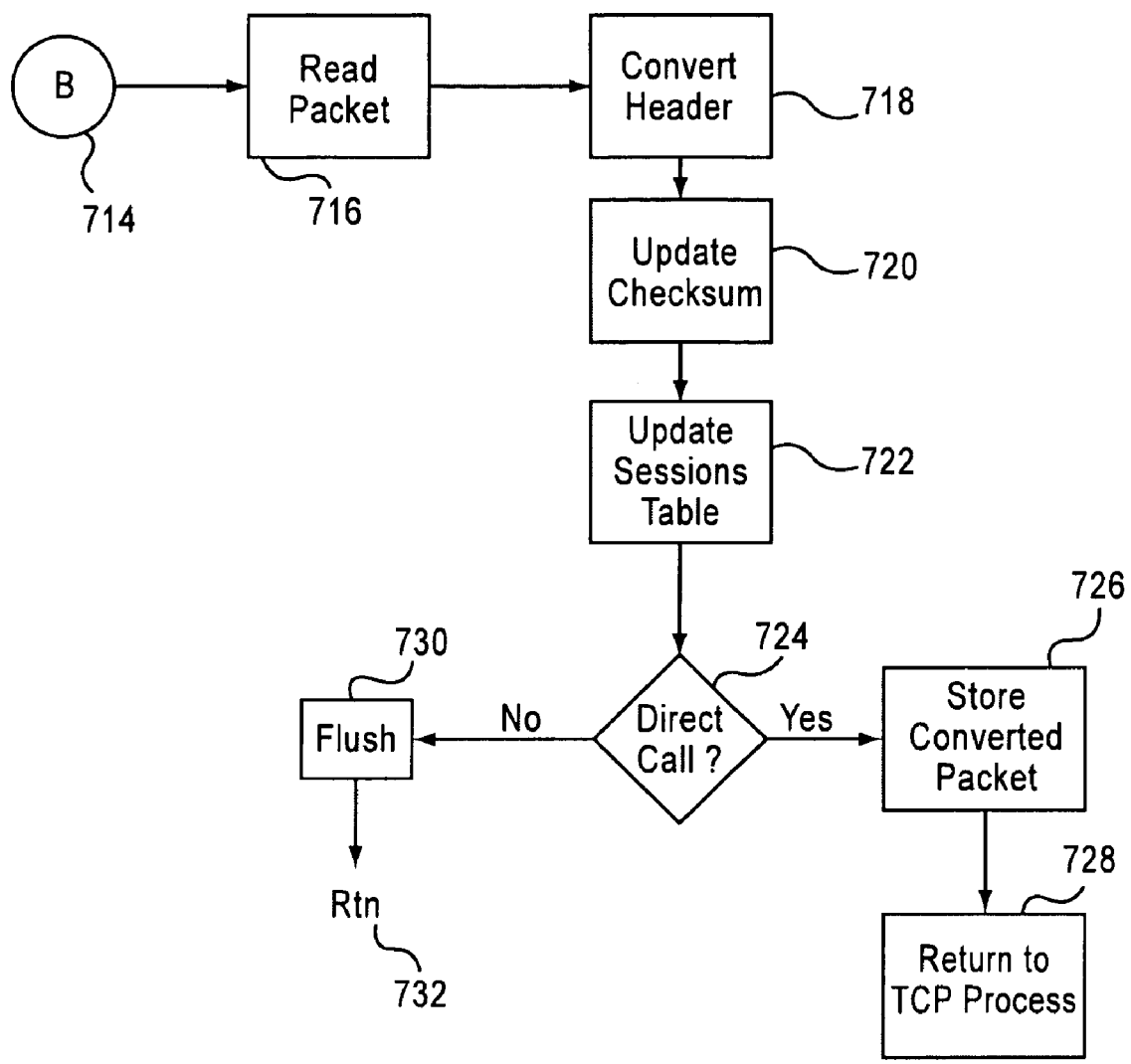

Referring back to FIG. 3B, if step 368 is no, then step 372 executes by calling the standard translation process disclosed with reference to FIGS. 7A and 7B. Most packets having a TCP format will end being process using these steps. Referring to FIG. 7A, step 702 executes by receiving a standard call instruction. Step 704 executes by parsing the header of the packet. By parsing the header, the disclosed embodiments read the data with the header into useable values. Step 706 executes by checking if the checksum has been modified. Essentially, the values in the packet are added according to a fixed formula. If a value within the packet has been changed, then the result should not match the original value prior to the change. No modification results in the same number.

For example, referring to FIG. 2B, the disclosed embodiments look at checksum value 2005 to determine if it matches the value of the current packet. If no, then step 708 executes by logging the error. In other words, packet 2002 includes an erroneous header and possible bad destination address. Step 710 executes by flushing the packet from the appropriate queues and lists within translation device 110.

If step 706 is yes, then step 712 executes by determining whether the packet is in a TCP format. In this translation operation, it is performed for non-standard, or static, traffic. If yes, then step 714 executes by continuing the flowchart in FIG. 2B. Step 716 executes by reading the packet. Step 718 executes by converting the header. The disclosed embodiments may use the conversion process disclosed that places a prefix onto a header address converted to hexadecimal. Alternatively, the disclosed embodiments may use another conversion process that produces the appropriate header. Step 720 executes by updating the checksum value.

Step 722 executes by updating the sessions table, such as sessions table 222 shown in FIG. 2A. Sessions table 222 may represent a list of current connections from differing resources that are exchanging information. Sessions table 222 is updated when communication occurs across one of its listed connections so that translation device 110 knows that the connection is still in use and not dead. Sessions table 222 is more static than connection table 224. Step 724 executes by determining whether the packet comes from a direct call.

A direct call, as disclosed above, refers to those calls that were not called from a routine function. In essence, the packet includes a packet in the body. The inner packet is translated without stripping the outer packet. The outer packet is not modified by the disclosed embodiments during these operations. A direct call might be from a program or process not normally handled or associated with translation device 110, and does not fit within the normal bounds of operations. Thus, if step 724 is yes, then step 726 executes by storing the packet with the converted header as the packet for delivery. Step 728 executes by returning to the process that was handling the outer packet, which is not translated, and queues the converted packet for delivery. The step returns to the function that called it. If step 724 is no, then a direct call was not made regarding the packet and step 730 executes by flushing the packet. This action pretty much just verifies the packet is valid and nothing further really needs to be done. Step 732 executes by returning back to the flowchart in FIG. 3B and delivering the packet to the converted address.

Referring back to FIG. 7A, if step 712 is no, then a TCP process is not applicable, and step 734 executes by determining whether a user datagram protocol (UDP) is applicable for delivering the packet. UDP differs from TCP as a protocol for connecting entities over a network. If no, then step 736 executes by indicating the packet is subject to the Internet control and messaging protocol (ICMP), and the flowchart goes to the process disclosed by FIG. 8. Step 738 executes by returning the flowchart to FIG. 3B.

If step 734 is yes, then step 740 executes by reading the packet. Step 742 executes by converting the header of the packet, as disclosed above. Step 744 executes by updating the checksum flag to indicate the packet header was changed. Step 746 executes by determining whether the packet conversion process is the result of a direct call. Direct calls are disclosed in greater detail above. If yes, then step 748 executes by indicating that the packet is a special case. Step 750 executes by logging the special case, as disclosed above. Step 752 executes by passing the special case to the firewall, such as firewall 252 shown in FIG. 2A. Because firewall 252 is an adaptive, or intelligent, firewall, the type of packet processed may be tagged to be dropped in the future. Step 745 executes by flushing the packet and step 756 executes by returning to the flowchart of FIG. 3B.

If step 746 is no, then step 758 executes by verifying packet is subject to ICMP protocol. Step 760 executes by converting the header from legacy format to the newer format, or, according the above example, from IPv4 to IPv6. Step 762 executes by determining whether the packet, or its converted header, is valid for those networks and resources connected to translation device 110. If yes, then step 764 executes by sending the packet onwards to the converted destination address. Step 766 executes by flushing the packet from the translation queue, such as translation queue 238 in FIG. 2A.

If step 762 is no, then step 768 executes by logging the error, as disclosed above. Step 770 executes by dropping the packet from the appropriate queues and lists. Thus, a packet having an invalid address is not delivered, but dropped, by translation device 110. Step 756 executes by returning the flowchart back to FIG. 3B. Thus, according to the disclosed embodiments, a packet received at translation device 110 may be converted to a packet having an address compatible with the legacy entity according to several different processes. Further, the packet may go through more than one process if the configuration of the packet demands different processes to properly determine the address.

With the execution of step 756, the flowchart is returned back to FIG. 3B. Step 374 executes by flushing the packet from the appropriate queues and lists in translation device 110. This step may have already been executed as shown in other Figures. Step 376 executes by returning the flowchart to the top such that another packet is processed.

Figure 8:
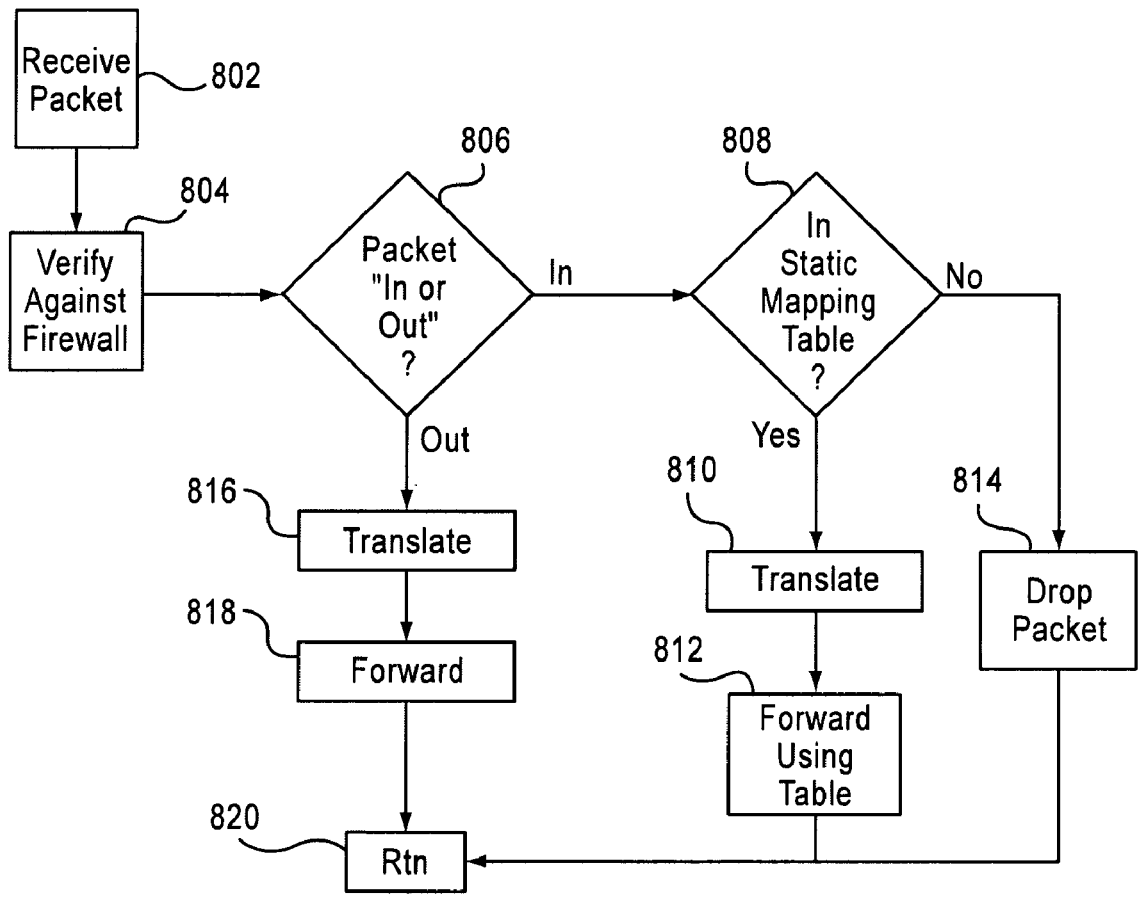
FIG. 8 illustrates a flowchart for calling an ICMP process according to the disclosed embodiments.
Figure 9:
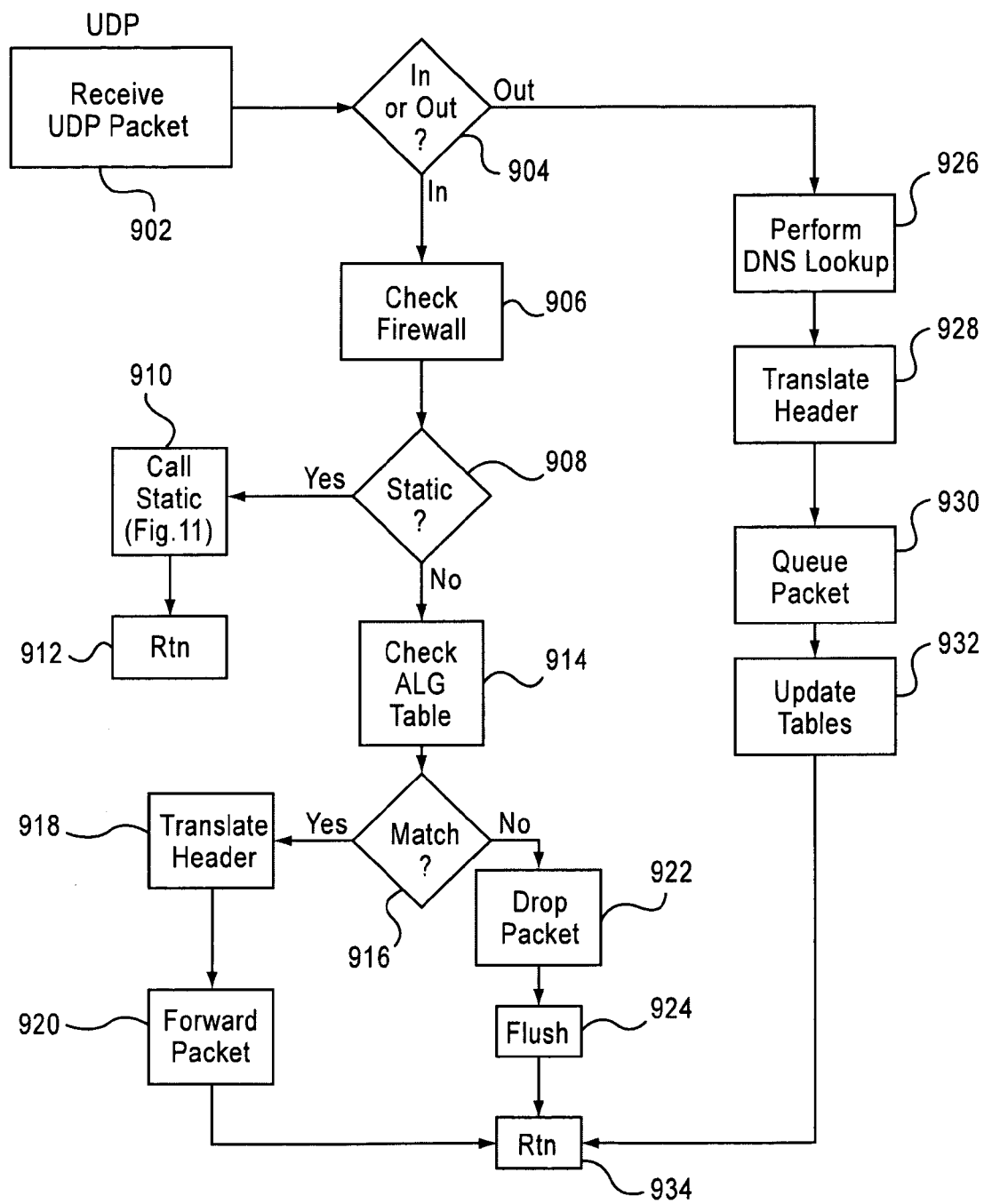
FIG. 9 illustrates a flowchart for calling a UDP process according to the disclosed embodiments.

If step 360 determines that the packet is not subject to a TCP protocol, then step 378 executes by determining whether the packet is subject to ICMP protocol. If yes, then step 380 executes by calling the ICMP routine disclosed with reference to FIG. 8. Referring to FIG. 8, step 802 executes by receiving the packet. Step 804 executes by verifying the packet against the firewall, such as firewall 252. As disclosed above, this step checks for any rules within firewall 252 that prevents the packet from being delivered. Firewall 252 prevents unauthorized communications.

Step 806 executes by determining whether the packet is categorized as "in" or "out." A packet is categorized "in" when the packet is flowing from a legacy resource, such as network 104, to a newer one, such as network 106. Using the example given above, the packet is going from an IPv4 network to an IPv6 one. A packet is categorized as "out" when it is flowing the opposite way, such as from network 106 to network 104. The reference point for whether the packet of flowing in or out is from the newer network side.

If the packet is coming into, or "in," the newer network, then step 808 executes by determining whether the address is in static mapping table 226. If yes, then step 810 executes by translating, or modifying, the address from IPv4 format, for example, to IPv6 format. Step 812 executes by forwarding the packet using the address entered into static mapping table 226. The disclosed embodiments use static mapping table 226 to find the destination address for the packet and places this address into the header. If step 808 is no, then step 814 executes by dropping the packet from consideration. The flowchart then proceeds to step 820.

If step 806 indicates that the packet is categorized as "out," then translation device 110 is forwarding the packet to a legacy address. For packets going "out," step 816 executes by translating the newer address such as the one in header 2020 of packet 2018 preferably back to a legacy address, such as address 2006. This translation step preferably is the reverse of the translations disclosed above, where prefix 2024 is removed and converted address 2022 is converted back to its legacy counterpart. Step 818 executes by forwarding the packet to the translated address. Step 820 executes by returning the flowchart back to FIG. 3B. Once back to FIG. 3B, step 382 executes by returning the flowchart to the top to process another packet.

Referring back to FIG. 3B, if step 378 is no, then the packet is not subject to ICMP. Step 384 then executes by determining whether the packet is an UDP packet. If yes, then step 386 executes by calling the UDP routine to deliver the packet. This process is disclosed with reference to FIG. 9. Step 902 of FIG. 9 executes by receiving the UDP packet. Step 904 executes by determining whether the packet is going "in" or "out," as disclosed above. Preferably, looking at whether a packet is "in" or "out" is done from the newer resource, or IPv6 side of the communications.

If step 904 indicates "in," then step 906 executes by checking the address of the packet against firewall 252 to verify delivery to the address is authorized. Step 908 executes by determining whether the address is in static mapping table 226. If yes, then step 910 executes by calling the static routine disclose above with reference to FIG. 11. Once FIG. 11 returns the flowchart back to FIG. 9, then step 912 executes by returning back to FIG. 3B.

If step 908 is no, then step 914 executes by checking ALG table 228 to determine whether the address fits one of the ALG exceptions. Step 916 executes by determining whether a match is found in the ALG table to the address. If yes, then step 918 executes by translating the header according to the process shown in FIGS. 7A and 7B. Step 920 executes by forwarding the packet to the translated address. The flowchart then proceeds to step 934.

If step 916 is no, then the address is not in ALG table 228 and step 922 executes by dropping the packet from the delivery process. Step 924 executes by flushing the packet from the appropriate queues and lists in translation device 110. Step 934 returns the flowchart back to FIG. 3B.

If step 904 indicates the packet is categorized as "out," then step 926 executes by performing a DNS lookup, which is part of the overall system already installed, to determine where the packet is trying to go. Step 928 executes by translating the header to the delivery address for the legacy network. FIGS. 7A and 7B may be called for this process. Step 930 executes by queuing the packet for delivery using the legacy address. Step 932 executes by updating the appropriate tables, such as sessions table 222, with the fact that a packet was sent to an address within the table. The flowchart then proceeds to step 934.

Referring back to FIG. 3B, if step 384 is no, then the packet includes an address not able to be dealt with by any of the protocols or special functions known to translation device 110. Thus, step 390 executes by logging the error. Step 392 executes by flushing the packet from the appropriate queues and lists, and step 394 executes by returning back to the top of the process to retrieve another packet for delivery.

Figure 10:
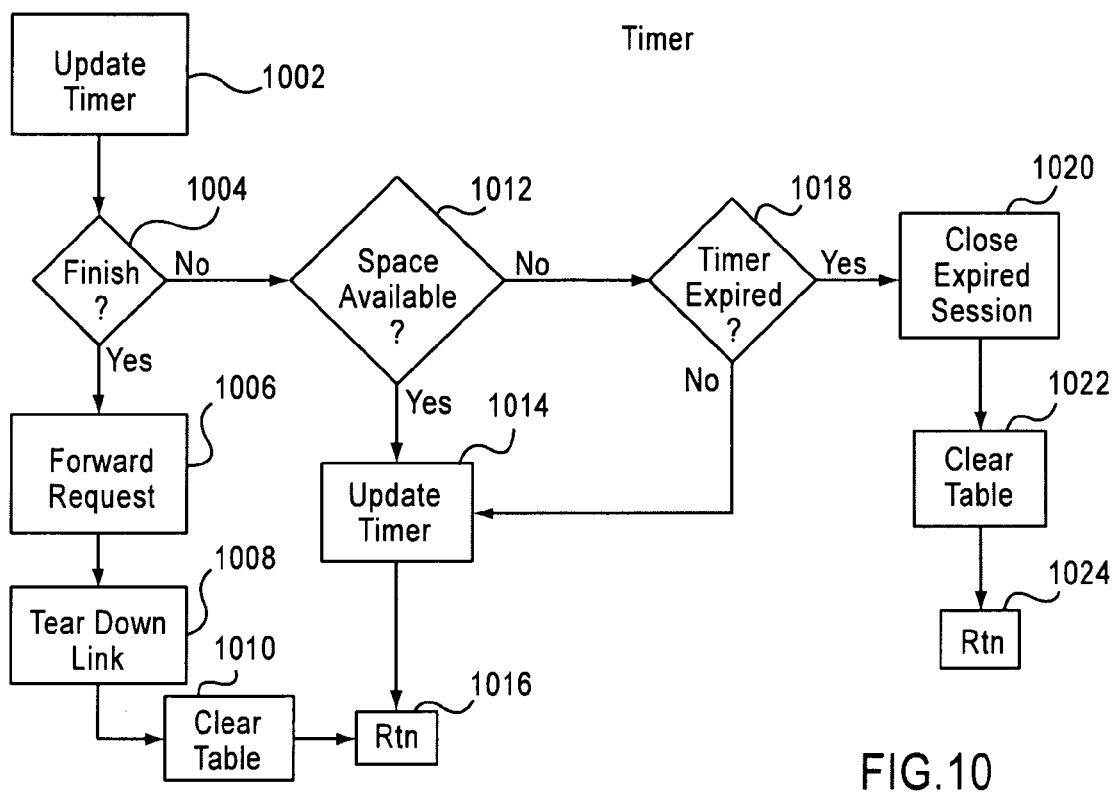
FIG. 10 illustrates a flowchart for timer operations according to the disclosed embodiments.

FIG. 10 depicts a flowchart for timer operations according to the disclosed embodiments. FIG. 10 sits outside the process flow of the other figures and deals with timer 220 shown in FIG. 2A. Timer 220 may be different from a normal clock that just provides times for the different components within translation device 110. Instead, timer 220 may be used to determine whether communication links should be built, maintained, or terminated.

Step 1002 executes by receiving an instruction to update timer 220. The instruction may generate as a result of a packet being delivered to one of the addresses in a table, or a new address just translated. Timer 220 is dynamically updated whenever a need or call for space is made and helps remove old or dead connections from the appropriate tables.

Step 1004 executes by determining whether the communication link is finished. If yes, then step 1006 executes by forwarding a request to the other computers or resources to tear down the link, using the IP addresses for the resources. Step 1008 executes by tearing down the link within translation device 110. Step 1010 executes by clearing the records of the resources used in the communication from the appropriate tables, such as sessions table 222 and connection table 224. The flowchart then proceeds to step 1016.

If step 1004 is no, then step 1012 executes by determining whether there is space available for continued operations. Space may become unavailable if other connections are generated or existing connections fail to terminate to accommodate the new ones. Space may refer to memory allocated to the various table listing the connections. If yes, then step 1014 executes by updating timer 220 that all is well. The flowchart then proceeds to step 1016.

If step 1012 is no, then step 1018 executes by determining whether timer 220 has expired on any existing connections. If no, then the flowchart proceeds to step 1014 to update timer 220. If yes, then step 1020 executes by closing the expired session to make room for new connections. Step 1022 executes by clearing the appropriate tables of the expired connection, and releasing those resource. Step 1024 executes by returning the flowchart to the top of FIG. 10, or waiting for another timer 220 instruction or update.

It will be apparent to those skilled in the art that various modifications and variations can be made in the disclosed embodiments of the present invention without departing from the spirit or scope of the invention. Thus, it is intended that the present invention covers the modifications and variations of the embodiments disclosed above provided that they come within the scope of any claims and their equivalents.

What is claimed is:

1. A method for communication between an Internet Protocol version 4 (IPv4) entity and an Internet Protocol version 6 (IPv6) entity, the method comprising:

receiving a packet at a translation device having an address not compatible with one of the entities, wherein the packet includes a format;

creating or updating a communication link between the IPv4 entity and the IPv6 entity;

converting the address to a compatible address by determining whether to apply a first translation process according to the format, and, if not, then determining whether to apply a second translation process according to the format;

sending the packet from the translation device to the entity according to the compatible address via the communication link.

2. The method of claim 1, wherein the converting step includes converting the address to a set value for the compatible address.

3. The method of claim 1, wherein the entity includes a device, network or application.

4. The method of claim 1, wherein the entity includes a legacy entity.

5. The method of claim 1, wherein a protocol for the packet includes an application layer transmission control protocol, an internet control and messaging protocol, a user datagram protocol or an application layer gateway protocol.

6. The method of claim 1, wherein the first or the second translation process includes adding a prefix to the address.

7. The method of claim 1, wherein the first or the second translation process includes retrieving the address from a table.

8. A translation device comprising:
   a first port to exchange a packet having a format with a first entity;
   a second port to exchange the packet with a second entity;
   a translator to convert the packet to include an address compatible with the second entity;
   a session table to track whether a communication session between the first entity and the second entity is open or closed; and
   a connection table that updates itself when the packet is received,
   wherein the translator is configured to determine whether to apply a first translation process according to the format to convert the packet, and, if not, then to determine whether to apply a second translation process according to the format.

9. The translation device of claim 8, wherein the table includes at least one table accessible by the translator to provide the compatible address.

10. The translation device of claim 8, wherein the connection table is accessible by the translator to store data indicating the packet was received at the first port.

11. The translation device of claim 8, wherein said translator converts the packet by translating an incompatible address of the packet to the compatible address.

12. The translation device of claim 11, wherein the incompatible address is converted to the compatible address using a formula.

13. A method for communicating with an entity, the method comprising:
   creating or updating a communication link at a translation device to the entity;
   determining an address of a packet destined for the entity is not compatible;
   determining a format for the packet, wherein the format relates to a protocol for the communication link;
   converting the address of the packet to a compatible address using the conversion process by determining whether to apply a first translation process according to the format, and, if not, then determining whether to apply a second translation process according to the format; and
   sending the packet from the translation device to the entity using the compatible address.

14. The method of claim 13, wherein the converting step includes translating the address to the compatible address using a formula.

15. The method of claim 13, further comprising determining protocol corresponding to the format of the packet, wherein the protocol includes an application layer transmission control protocol, an internet control and messaging protocol, a user datagram protocol or application layer gateway protocol.

16. The method of claim 13, wherein the entity includes a legacy device compatible with Internet Protocol version 4 (IPv4).

17. The method of claim 13, wherein the first or the second translation process includes adding a prefix to the address.

18. The method of claim 13, wherein the first or the second translation process includes retrieving the address from a table.

* * * * *